April 18, 1972   R. L. OLSON   3,657,403
METHOD OF MAKING PRESSURIZABLE ELASTOMERIC STRUCTURES
Original Filed Jan. 18, 1965
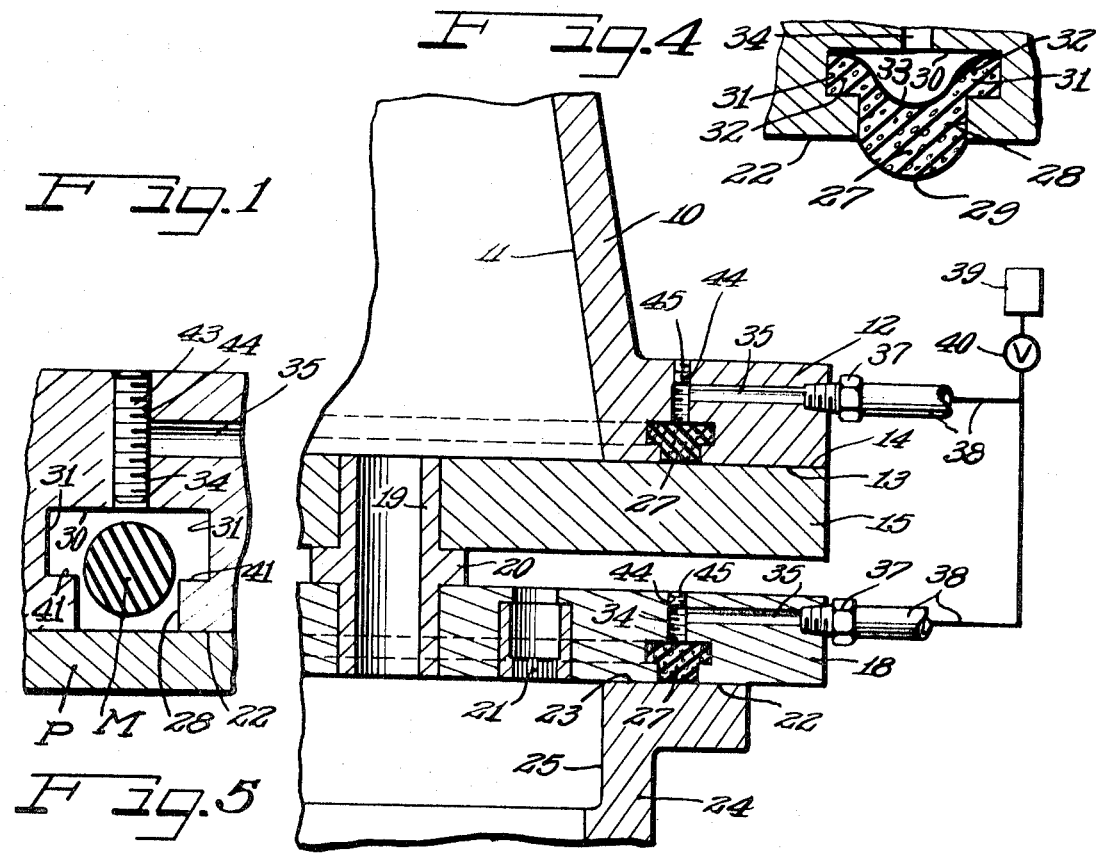
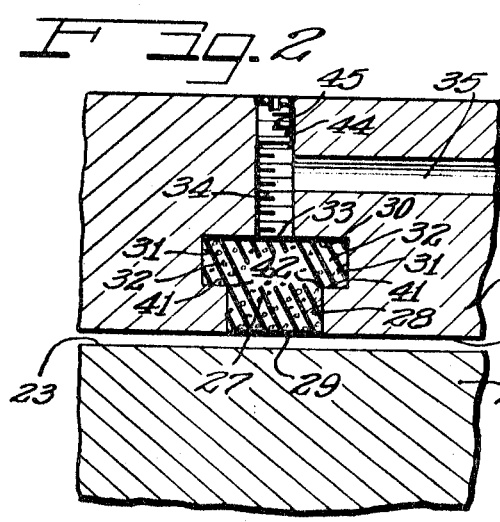
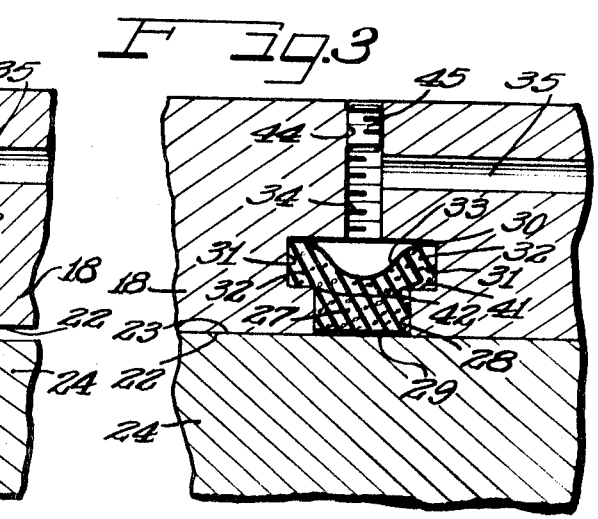
INVENTOR.
Richard L. Olson
BY  ATTORNEYS United States Patent Office 3,657,403
Patented Apr. 18, 1972

3,657,403
METHOD OF MAKING PRESSURIZABLE
ELASTOMERIC STRUCTURES
Richard L. Olson, Hickory Hills, Ill., assignor to Dike-O-Seal, Incorporated, Chicago, Ill.
Original application Jan. 18, 1965, Ser. No. 426,308, now Patent No. 3,331,610, dated July 18, 1967. Divided and this application May 3, 1967, Ser. No. 635,911
Int. Cl. B29d 27/00
U.S. Cl. 264—51                                    4 Claims

ABSTRACT OF THE DISCLOSURE

An elastomeric body is molded and cured in situ to substantially fill a recess, bonded to side walls defining a recess and maintained in freely separable engagement with a root surface in the recess, so that a pressurizing fluid can be introduced between the body and the root surface.

---

This application is a division of my application Ser. No. 426,308, filed Jan. 18, 1965 now Pat. No. 3,331,610 issued July 18, 1967.

This invention relates to improvements in the in situ molding of pressurizable elastomeric bodies in recessed members in which they are to be used. More particularly, the invention concerns the molding of elastomeric material having compressible gas cells by expanding the material into completely filling relation to a recess in which the cured body of elastomeric material is to be used by pressurizing the same to thrust from a face of the recessed member such as in the sealing of cavitated assemblies in which separable joints must be sealed against pressure differential leakage, for example in core boxes, pressure molds, blow plates and mating flasks or molds, other enclosures where an effective seal against internal or external pressure is needed temporarily, and in other apparatus in which it is desirable to afford a pressure thrust of the elastomeric body against a member opposing the member which supports the elastomeric body.

In the molding art and other practical areas of utility, it is desirable to have a pressurizable elastomeric body which is normally substantially within a parting face plane so as to avoid any substantial projection of the elastomeric body from the parting face, whereby relative sliding or grazing or other contacting movement of an object across the parting face will not damage the elastomeric body. On the other hand, pressurization of the elastomeric body against a confronting parting face for sealing or other purposes requiring fluid pressure behind the elastomeric body is a desirable relationship. Further, it is desirable to provide such elastomeric bodies in a recessed parting face which may be of variable and sometimes complicated contour for matching with an opposing complementary parting face and in which the elastomeric body must be in the form of an elongated strip with a face which follows the contouring of the recessed parting face within which the elastomeric body is carried.

A special problem is encountered where the elastomeric pressurizable body is molded directly in place with the body bonded to the side walls defining the recess so as to avoid any subsequent pressure fluid leakage thereby toward the outside, and wherein it is necessary that the back or inner face of the elastomeric body be substantially free from the root surface of the recess in which the body is molded. In such molding the problem of possible air entrapment within the recess and behind the elastomeric body is ever present to reduce, and for some purposes to destroy the efficiency in use of the pressurizable elastomeric body due to formation of trapped air cavities in the back portion of the body. It is to eliminate this problem that the present invention is primarily directed.

Accordingly, it is an important object of the present invention to provide a new and improved method of making pressurizable elastomeric structures.

Another object of the invention is to provide a new and improved method of solving the problem of air entrapment in the in situ molding of pressurizable elastomeric structures.

A further object of the invention is to provide a new and improved method of making a seal structure embodying compressible closed cell elastomeric material and adapted to be pressurized in use.

To the attainment of these and other objects, an elastomeric body is molded and cured in situ to fill a recess, bonded to side walls defining the recess and maintained in freely separable engagement with root surface in the recess so that a pressurizing fluid can be introduced between the body and the root surface.

Other objects, features and advantages of the present invention will be readily apparent from the following detailed description of preferred embodiments thereof taken in conjunction with the accompanying drawings, in which:

FIG. 1 is a fragmentary vertical sectional detail view through a portion of a core blowing machine magazine structure and an associated core box member and disclosing use of the present invention in the form of pressurizable elastomeric sealing strip bodies;

FIG. 2 is a substantially enlarged fragmentary sectional detail view, taken in substantially the same plane as FIG. 1 but showing only one of the pressurizable elastomeric bodies and the immediately adjacent components of the assembly, the parting faces of the components being separated;

FIG. 3 is a sectional detail view similar to FIG. 2 but showing the parting faces clamped together and the pressurizable body in the pressurized condition thereof;

FIG. 4 is a sectional detail view similar to FIG. 3, but showing by way of comparison how the pressurizable body acts under pressurization but without an opposing parting face; and FIG. 5 is a sectional detail view illustrative of certain features of the method of making the pressurizable elastomeric structure.

Representative of an important industrial use for the pressurizable elastomeric structures of the present invention is a sand core blowing machine structure as depicted in FIG. 1. This comprises a magazine 10 having a sand hopper 11 within which is housed, in operation, a charge of core sand and suitable binder, such as is well known in the foundry art. About its lower end, the magazine 10 has a lateral attachment flange 12 providing a parting face 13 against which a parting face marginal surface area 14 of a blow plate member 15 is adapted to be drawn under compression by securing means such as bolts. In the assembly shown, the blow plate 15 serves as the bottom closure for the magazine 10, and carries a lower blow plate member 18 connected thereto by one or more blow bushings 19 having respective spacer flanges 20 between the plate members to maintain the same in spaced relation so as to afford air exhaust space or gap for screened vents 21 in the lower plate 18. Marginally the lower blow plate member 18 has a lower parting face 22 adapted to be engaged by a parting face 23 of a sand mold 24 such as a dump core box, blow-in drier, and the like.

Since the sand used for molding purposes is necessarily of fine mesh screen grade, and the air pressure used in blowing the sand from the reservoir chamber 11 is from forty to one hundred and forty pounds per square inch, depending upon practical requirements in any particular case, and may even exceed such pressure in special situations, blow-by through the parting faces is a hazard that must be guarded against in spite of any imperfections in the parting faces, slight warpages, and the like. Some sort of gasket or sealing means are customarily employed in an endeavor to prevent blow-by not only from the cavity defining the magazine chamber 11 but also from the cavity defined by a chamber 25 within the molding box member 24. Heretofore, seals for this purpose have comprised projecting ribs, ridges or tongues which, at least during separation of the parting faces project substantially beyond the parting face of the member carrying the seal. This has certain drawbacks such as liability to damage, dragging in respect to close clearances when moving one of the separable members relative to the other, and the requirement for a matching tongue or rib ridge receiving groove in the mating member in the case of a tongue and groove seal and in the molding plate member in the case of a compression seal. Where, in a core blowing operation for example, a plurality of identical core boxes is used in sequence with one blow plate, the tongue and groove type of seal, of course, requires that each of the core boxes have a tongue type of seal to fit a matching groove in the blow plate, or conversely, each of the core boxes must have a groove to mate with the tongue type of seal on the blow plate. With the compression type seal, the member of the compression assembly which mates with the seal-carrying member does not need a matching groove, but a molding or match plate having the groove must be provided for molding the projecting portion of the seal.

According to the present invention, a pressurizable elastomeric structure, and by way of example a seal 27, is provided which is adapted to be molded directly in place in the parting face of one of the members of the pressure assembly and normally lies at least substantially within the plane of such parting face so that it affords substantially no outward projection when dormant. In use, however, the seal 27 sealingly engages against an opposing parting face. As shown in FIG. 1, one of the seals 27 is carried by one of the separable members at each of the separable joints. Since the blow plate 15 is interchangeable with other blow plates from time-to-time, the parting face 13 of the machine magazine flange 12, in this instance, has the seal 27. Desirably, the parting face 22 of the core-box-engageable and matching blow plate member 18 carries the seal. Since both of the seals 27 are substantially the same, a description of one will suffice for the other.

On reference to FIGS. 1 and 2, the seal 27 is shown in the dormant, non-sealing condition, emphasized by the separation between the members 18 and 24 in FIG. 2. In this condition, the seal 27 fills an elongated recess or groove 28 in the parting face 22 of ample width to expose a sealing face 29 of the seal in the plane of the parting face 22. Aligned with its root surface 30, the groove 28 has at each side an undercut 31 providing an interlock channel or recess within which a respective complementary interlock flange portion 32 of the seal is engaged. In effect, the groove and the seal are of complementary generally T-shape cross-section, with the root surface 30 substantially wider in area than and directly opposite to the groove mouth or opening.

Excellent results have been obtained by making the seal 27 from a compressible, multi-closed-cell elastomer possessing a high degree of resiliency. While cellular rubber as such may be used, different types of synthetic resinous materials that are capable of being molded and set to a resiliently flexible, compressible, cellular elastomer may be used. At its sides, the seal body is desirable bonded to the surfaces defining the groove 28 including the undercut recess portions 31. Opposing the entire area of the root surface 30 of the groove, the seal body is provided with an abuttingly confronting inner or back surface 33 which is free and unattached with respect to the groove root surface.

Although the compressible closed cell elastomeric material body of the seal 27 completely fills the groove 28, the bulk compressible nature (as distinguished from merely bulk deflectable nature of a solid, non-cellular elastomer) of the seal, enables the efficient introduction of pressure fluid between the groove root surface 30 and the opposing base surface 33 of the seal to pressurize the seal for sealing purposes. Even though the seal strip may be located entirely about a cavity area to be sealed, introduction of pressure fluid may be at one point along the back face 33. As shown, a pressure fluid port 34 opens through the root surface 30 and is in communication through a duct passage 35 opening through an outer surface of the associated member 18 (or 12) and arranged to be connected as by means of a nipple 37 with a conduit 38 leading from a suitable pressure source 39 such as a compressor, compressed air storage tank, or the like, 39 and under the control of a valve 40 by which air, serving as the pressure fluid, can be introduced for pressurizing the seal and bled off to release or deactivate the seal. Although the pressurizing system has been shown in FIG. 1 schematically as operable independently of any air pressure system and the control means therefor operable in relation to the core blowing functions related to the magazine 10, it will be readily apparent that an integrated, synchronized, timed, sequentially operable, or otherwise suitable cooperative relationship may be provided for. For operating convenience, for example, a pneumatic or electro-pneumatic arrangement may be provided for wherein the operator is require to operate a single actuating device such as a switch, valve lever, or the like, to effect both pressurization of the seals 27 is desirably effected to be effective before the effect of operating pressure is present in the joint of the cavitated assembly having the pressurized seal.

As a result of the compressible and elastic characteristics of the seal body 27 introduction of the pressure fluid through the port 34 into the opposed-face area of the unattached root surface 30 and the back face 33 of the seal, the back face 33 and the body of the seal act diaphragm-like to open a pressure fluid gap throughout the length of the seal strip. This action is so uniformly rapid throughout the length of the strip as to be, for all practical purposes, instantaneous, and even though the parting faces of the cavitated members are in abutment so that said sealing face 29 is held against any substantial displacement from the parting face of the member in which the seal is mounted. Of course, where there is initially a gap between the parting faces, or where the opposed members are separable under thrust of the pressurizable elastomeric body, the body may be made of a solid elastomer, that is an elastomer that may have practically no gas bubbles or cells but comprises a low durometer elastomeric material. Since the outer face 29 of the elastomeric body is under the circumstances mentioned displaceable from the parting face within which its recess is contained, sufficient diaphragm-like displacement of the body of the seal occurs under pressurization to afford ample pressure-receiving chamber area between the pressure-separable root surface of the groove and the opposing face or back surface of the pressurizable body. Then, due to the inherent resilience and elasticity of the pressurizable elastomeric body material, it springs back to the normal groove-filling, root surface abutting condition upon release from the biasing fluid pressure.

As the elastomeric body back surface 33 cavitates under the fluid pressure applied thereto, outward thrust is generated through the body 27 toward the surface 29 whereby the latter thrusts against the opposing joint or parting surface 23 (or 14, as the case may be) as indicated in FIG. 3. The magnitude of thrust can be readily calculated or predetermined for the particular service requirements by the compression factor or compressibility of the material of the body 27, the pressure exerted by the pressure fluid, and the area of the back face 33 relative to the face 29. It will be apparent, also, that as the back face 33 cavitates away from the root face 30, the total surface area of the face 33 progressively increases by stretching of such face and thus the ratio of pressure area of the back face of the outer face 29 area progressively increases for thrusting or sealing efficiency. This result is enhanced by having the total area of the back face 33 exposed to the pressure fluid initially substantially greater than the area of the surface 29, as is effected by having the root of the confining groove of greater width than the outer end of the groove confining the sides of the seal body 27 and determining the width of the face 29.

Upon release of the pressurized fluid or bleed-off, the body 27 instantly relaxes, expands with diaphragm pumping action to evacuate the pressure fluid between the back surface 33 and the root surface 30 and the surface 29 remains in the plane of the parting face 22 when the opposing member 24 is separated.

If, for any reason, whether intentional or inadvertent, the pressurizing pressure fluid is not bled off when the opposed member is separated relative to the elastomeric body 27, or if the pressure fluid is admitted behind the body in the absence of an opposing parting face contiguous to the parting face 22, the resilient flexibility inherent in the body 27 permits the surface 29 to be bulged outwardly as shown in FIG. 4 due to the lack of confinement. However, blowing out of the body 27 is prevented because the sides of the body are bonded to the opposing surfaces of the confining groove 28. As a matter of fact, where it is desirable that the body 27 positively confine all of the pressurizing pressure fluid, without leakage, diaphragm-like pressurizing or expanding of the body as shown in FIG. 4 may be deliberately effected for testing purposes.

Full bonding of the sides of the elastomeric body strip 27 within the groove 28, especially adjacent to the surface 29 is advantageous where fine particles such as sand are entrained in the pressure fluid to be confined within the cavitated assembly because the bonded relation avoids working in of particles of such material between the body and the confining wall of the groove.

Although most generally it is desirable to have the elastomeric body 27 bonded at its sides in the groove 28, for some purposes this may not be necessary, and then the undercut groove portions 31 and the lateral flanges 32 of the body therein will function advantageously to seal against leakage of pressure fluid from behind the body during a pressurizing operation by what may be referred to as a "corking" or pressure sealing coaction between the respective flanges 32 and inwardly facing shoulders 41 opposing the flanges and toward which the flanges 32 are pressed during pressurization of the body. More particularly, cavitation of the pressurized back portion of the body 27 toward the face 29 will press the material of the body and more particularly of the flanges 32 into the groove undercuts 31 and especially the shoulder surfaces 41, and the salient angles 42 at juncture of the narrow portion of the groove 28 with the wider portion thereof.

An eminently satisfactory method of making the pressurizable structure comprises in situ molding of the body 27 in the groove 28. Such in situ molding of the seal may be accomplished in accordance with the teachings of my Pat. No. 2,815,549, issued Dec. 10, 1957, with such modifications as necessary to attain the desirable results herein for maintaining the face 29 substantially within the plane of the associated parting face 22, the sides of the body bonded to the opposing surfaces of the confining groove and the back face 33 of the body substantially completely unbonded and free from the opposing root surface 30 of the groove. To this end, the groove 28 is completely preformed in any preferred manner as by properly coring it in a casting, or machining it as by means of suitable milling procedure. Relatively rough machining will suffice since precision of the surfaces within the groove and even in respect to the exact location of the groove opening may not be critical.

As a preliminary step in the molding process, the side wall surfaces defining the groove 28, including the surfaces 31 and 41 are treated with a suitable bonding agent. On the root surface 30 of the groove, a suitable parting agent is applied. Then uncured elastomeric material M (FIG. 5) is placed, as in the form of a convenient extruded rope or rod thereof into the groove 28 in a predetermined quantity per lineal extent of the groove. A molding plate P is placed in closing relation to the groove 28. Such plate may be a separate molding plate or may be the member with which the parting face such as 22 will form a joint in use of the body 27 as a seal. The assembly is then ready for endothermic or exothermic curing, or even cold curing, as may be proper for the material M and, where desirable, to release a blowing agent therein to produce the non-communicating, preferably small closed cell gas filled bubbles in the matrix of the cured elastomeric body. It will be understood that the opposing surface of the molding plate P will be treated with the parting agent. As a result, on completion of the curing the body 27 will be bonded at its sides to the sides of the groove 28, but will remain free from the plate P at the surface 29 and free from the root surface 30 of the groove 28.

As expansion of the elastomeric material M proceeds during curing within the closed chamber defined within the groove 28, air is pushed from the groove forwardly and escapes through the joint between the parting face 22 and the molding plate P. Air which might otherwise be trapped in the root area of the groove is evacuated through the port 34. Escape of the elastomeric material through the evacuating port is prevented by suitable means such as a plug 43 conveniently comprising a screw which is loosely threadedly engaged in the port 34 through an extension bore 44 accessible from the outside of the elastomeric-body-carrying member. Due to its high viscosity, the elastomeric material will not escape through the loose threads, but air can readily escape under the pressure exerted by the expanding body. After molding of the body has been completed, the plug 43 is removed, and a shorter closure plug 45 is sealingly engaged in the extension bore 44 and leaves the port 34 in free communication with the passage 35. If preferred, the molding air escape means may, instead of the plug 43, comprise a suitable screen such as the type of screen customarily employed for the vents 21 (FIG. 1) which will permit the air to escape while retaining the viscous elastomeric material against escape during the molding and curing process.

It will be understood that variations and modifications may be effected without departing from the spirit and scope of the novel concepts of this invention.

I claim as my invention:

1. A method of sealing a pressure assembly having a pair of separable, substantially rigid members with confronting parting faces providing a joint to be sealed against a fluid pressure differential, there being a seal-receiving groove in one of said parting faces having side walls and a root surface in the bottom of the groove with a pressure fluid passage communicating with the groove at said root surface, the method comprising:

initially applying to said walls only a bonding agent capable of permanently bonding a predetermined resiliently flexible fluid impervious closed cell elastomer to said walls in fluid tight relation as an incident to curing of the elastomer in situ within the recess, and applying a parting agent to said root surface to prevent adherence of the elastomer to the root surface;

placing in said groove a sufficient quantity of uncured elastomer with blowing agent incorporated therein to fill the groove when said elastomer is cured and expanded;

coating a groove closing surface of a molding plate with a parting agent capable of preventing adhesion of said elastomer to said plate;

placing said plate against the parting face having said groove and in closing relation to said groove;

curing said elastomer under conditions to cause said elastomer to expand and fill said groove with said plate confining the expanded elastomer to said groove;

expelling air trapped between said elastomer and said root surface through said passage while retaining the elastomer against escape through said passage, and also expelling air from said groove past said plate;

after curing has been completed removing said plate so that the other of said rigid members can be placed in confronting relation to said parting face having the groove and cured elastomer body therein; and preparing said passage for introduction of pressure fluid into said groove between said root surface and the cured elastomer body to effect pressurization of the body to thrust it toward said other member.

2. In a method of in situ molding of a resiliently flexible fluid impervious elastomer body filling a recess in the face of a member so that thereafter the elastomer body can be pressurized by introducing fluid pressure between it and a root surface of the recess without leakage, said recess having wall surfaces defining the same and extending away from said root surface and terminating at an opening in said face opposite said root surface, and said root surface having a pressure fluid port connected thereto for introducing the pressure fluid between said root surface and the elastomer body for the purpose of pushing said body away from said root surface to press against a member confronting said opening, the steps comprising:

initially applying to said wall surfaces only of said recess a bonding agent capable of permanently bonding said elastomer to said surfaces as an incident to curing of the elastomer in situ within the recess, and applying a parting agent to said root surface to prevent adherence of said elastomer to the root surface;

placing in closing relation across said opening a plate surface to which the elastomer will not adhere and thereby confining the elastomer to said recess and within said face of the member during curing but enabling ready separation of said plate surface from the cured elastomer body;

curing said elastomer under conditions to fill said recess and form said fluid impervious body against all of said surfaces including said plate surface, resulting in bonding of said elastomer body in fluid tight relation to the wall surfaces of said recess but remaining freely separable relative to said root surface and said plate surface; and expelling air from said recess past said plate surface and expelling through said port air trapped between the curing elastomer body and the root surface incident to filling of said recess by said elastomer body but restraining escape of the curing elastomer through said port.

3. A method according to claim 2, including securing an air bleed device in said port closely adjacent to said root surface before effecting said curing and expelling the air through said port past said air bleed device and thereby retaining the elastomer against escape through said port.

4. A method according to claim 2, including loosely threading an air bleed plug into said port to retain the elastomer against escape through said port but permitting the air to be expelled past said plug, and after curing of the elastomer body has been completed removing said plug and effecting communication of said port with a fluid pressure passage.

References Cited

UNITED STATES PATENTS

| | | | |
|---|---|---|---|
| 1,484,731 | 2/1924 | Malm | 264—45 X |
| 2,550,140 | 4/1951 | Dotson | 249—141 X |
| 2,713,699 | 7/1955 | Pooley | 264—54 X |
| 2,815,549 | 12/1957 | Olson | 249—114 X |
| 2,995,778 | 8/1961 | Hill | 249—141 X |
| 3,095,619 | 7/1963 | Peterson | 277—1 X |
| 3,132,382 | 5/1964 | Magester | 264—54 |
| 3,137,744 | 6/1964 | Burrus | 264—54 |
| 3,163,687 | 12/1964 | Einhorn | 249—141 X |
| 3,166,332 | 1/1965 | Olson | 264—48 X |

FOREIGN PATENTS

| | | | |
|---|---|---|---|
| 539,786 | 1/1969 | Great Britain | 264—51 |

JULIUS FROME, Primary Examiner

P. A. LEIPOLD, Assistant Examiner

U.S. Cl. X.R.

18—30 WV, DIG 62; 264—54, 338